United States Patent
Tsukada et al.

(10) Patent No.: US 9,120,072 B2
(45) Date of Patent: Sep. 1, 2015

(54) AMMONIA DETOXIFICATION DEVICE

(75) Inventors: Tsutomu Tsukada, Nagaokakyo (JP);
Hiroshi Imamura, Nagaokakyo (JP);
Hiroki Kuzuoka, Nagaokakyo (JP);
Hiroaki Kaneshiro, Nagaokakyo (JP);
Isamu Nagai, Nagaokakyo (JP);
Takashi Kataoka, Nagaokakyo (JP)

(73) Assignee: KANKEN TECHNO CO., LTD., Kyoto (JP)

(*) Notice: Subject to any disclaimer, the term of this patent is extended or adjusted under 35 U.S.C. 154(b) by 0 days.

(21) Appl. No.: 14/001,278

(22) PCT Filed: Feb. 2, 2012

(86) PCT No.: PCT/JP2012/000717
§ 371 (c)(1),
(2), (4) Date: Oct. 23, 2013

(87) PCT Pub. No.: WO2012/120773
PCT Pub. Date: Sep. 13, 2012

(65) Prior Publication Data
US 2014/0056785 A1    Feb. 27, 2014

(30) Foreign Application Priority Data
Mar. 7, 2011    (JP) .................................. 2011-049233

(51) Int. Cl.
*B01D 53/58* (2006.01)
*B01J 19/00* (2006.01)
(Continued)

(52) U.S. Cl.
CPC ............. *B01J 19/0046* (2013.01); *B01D 53/58* (2013.01); *F23G 7/063* (2013.01); *F23G 7/068* (2013.01);
(Continued)

(58) Field of Classification Search
USPC .......................................... 422/174, 145, 643
See application file for complete search history.

(56) References Cited

U.S. PATENT DOCUMENTS

| 2,013,809 A | 9/1935 | Hall |
| 3,661,507 A | 5/1972 | Breitbach et al. |

(Continued)

FOREIGN PATENT DOCUMENTS

| JP | 2004-162963 A | 6/2004 |
| JP | 2005-265234 A | 9/2005 |

(Continued)

OTHER PUBLICATIONS

International Search Report of PCT/JP2012/000717 dated Mar. 13, 2012.

(Continued)

*Primary Examiner* — Lessanework Seifu
(74) *Attorney, Agent, or Firm* — Lucas & Mercanti, LLP

(57) ABSTRACT

Provided is an ammonia detoxification device that, when detoxifying ammonia by thermal decomposition, is capable of preventing the generation of nitrogen oxides. That is, the problem is solved by configuring the ammonia detoxification device using: an electric heater; an ammonia decomposition chamber that accepts an ammonia-containing gas to be treated and thermally decomposes the ammonia in the absence of oxygen using heat from the electric heater; a thermally decomposed gas-burning chamber that accepts the nitrogen- and hydrogen-containing gas to be treated that has been generated by the thermal decomposition of the ammonia and discharged from the ammonia decomposition chamber, and an air-supplying means for supplying air from the outside into the thermally the thermally decomposed gas-burning chamber to burn the hydrogen.

3 Claims, 6 Drawing Sheets

(51) Int. Cl.
*F23G 7/06* (2006.01)
*F23L 15/02* (2006.01)

(52) U.S. Cl.
CPC .............. *F23L 15/02* (2013.01); *F23J 2215/10* (2013.01); *F23J 2219/40* (2013.01); *F23J 2219/80* (2013.01)

(56) References Cited

U.S. PATENT DOCUMENTS 3,804,596 A 4/1974 Fischer
5,460,789 A 10/1995 Wilhelm
5,871,349 A 2/1999 Johnson et al.
2006/0099123 A1* 5/2006 Seeley et al. .................. 423/237

FOREIGN PATENT DOCUMENTS

JP 2005-536336 A 12/2005
JP 2001-332498 A 11/2011

OTHER PUBLICATIONS

Supplementary European Search Report for corresponding European application for EP12755188 dated Jul. 11, 2014.

* cited by examiner

AMMONIA DETOXIFICATION DEVICE

CROSS-REFERENCE TO RELATED APPLICATIONS

This application is a 371 of PCT/JP2012/000717 filed Feb. 2, 2012, which claims priority of Japanese Application No. 2011-09233 filed Mar. 7, 2011, the contents of each of which are incorporated herein by reference.

TECHNICAL FIELD

The present invention relates to an ammonia detoxification device capable of minimizing generation of nitrogen oxides in detoxifying ammonia contained in a gas to be treated by thermal decomposition.

BACKGROUND ART

Ammonia ($NH_3$) is gas that is colorless under normal temperature and normal pressure having a peculiar strong irritating odor, and is strongly irritative to human mucosa. A person who sucks ammonia gas at a concentration of 0.1% or higher will exhibit a critical condition. For this reason, ammonia is designated as one of the offensive odor substances under the Offensive Odor Control Act, and is also designated as a deleterious substance under the Poisonous and Deleterious Substances Control Law.

On the other hand, ammonia is an industrially very important substance because it is a starting material for basic chemicals such as nitric acid, and is often synthesized as a byproduct in the course of industrial production. Therefore, production facilities that emit exhaust gas containing ammonia are requested to install an ammonia detoxification device for detoxifying ammonia contained in the exhaust gas.

For detoxifying ammonia, various methods including a wet detoxification method in which ammonia is absorbed in water or a chemical liquid, and a thermal decomposition method of thermally decomposing ammonia have been developed.

Among these, the thermal decomposition method is currently widespread because, in contrast to the wet detoxification method, it does not require additional installation of wastewater treatment equipment and can realize a compact ammonia detoxification device, and runs at a relatively low cost.

CITATION LIST

Patent Literature

[PTL 1] Japanese Laid-Open Patent Publication No. 2010-51921

SUMMARY OF THE INVENTION

Problems to be Solved by the Invention

However, in the ammonia detoxification device employing such a thermal decomposition method, there is still room for improvement. To be more specific, when ammonia is decomposed, oxygen in the gas to be treated or in the air reacts with nitrogen generated by the thermal decomposition of ammonia at high temperature to generate nitrogen oxides such as nitrogen monoxide and nitrogen dioxide that are air pollution causative substances causing photochemical smog, acid rain, or the like. Therefore, extra labor is needed for removing nitrogen oxides from the gas to be treated with a denitration catalyst (for example, Patent Literature 1) or the like after thermal decomposition of ammonia.

The present invention was devised in light of such a problem in the conventional art, and it is a principal object of the present invention to provide an ammonia detoxification device capable of avoiding generation of nitrogen oxides in detoxifying ammonia by thermal decomposition.

Solution to the Problems

The invention described in item 1 is
an ammonia detoxification device 10 including:
an electric heater 14;
an ammonia decomposition chamber 24 that receives gas to be treated F containing ammonia, and thermally decomposes the ammonia in the absence of oxygen by heat from the electric heater 14;
a thermally decomposed gas burning chamber 26 that receives the gas to be treated F containing nitrogen and hydrogen generated by thermal decomposition of the ammonia discharged from the ammonia decomposition chamber 24; and
air supplying means 16 that supplies air A for burning the hydrogen from outside to the thermally decomposed gas burning chamber 26.

According to the present invention, the gas to be treated F containing ammonia discharged from its generation source (for example, GaN (gallium nitride)-based LED producing device) is received in the ammonia decomposition chamber 24, and ammonia is thermally decomposed in the absence of oxygen by heat from the electric heater 14 in the ammonia decomposition chamber 24. By thermal decomposition in the absence of oxygen, ammonia is decomposed into nitrogen and hydrogen as represented by the following formula. Since there is no oxygen in the ammonia decomposition chamber 24, theoretically no nitrogen oxide is generated by thermal decomposition of ammonia (in the present invention, the heat source is limited to the electric heater 14 because it can reliably realize "oxygen-free condition" in contrast to the heat sources that require combustion air such as a gas burner).

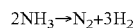

$$2NH_3 \rightarrow N_2 + 3H_2$$

The gas to be treated F after thermal decomposition containing nitrogen and hydrogen is received in the thermally decomposed gas burning chamber 26 where it is supplied with air A from outside by the air supplying means 16. Oxygen in the air A binds with the hydrogen (in other words, hydrogen burns) to generate water.

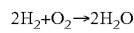

$$2H_2 + O_2 \rightarrow 2H_2O$$

As described above, according to the ammonia detoxification device 10 of the present invention, it is possible to decompose and detoxify ammonia into nitrogen and water without generation of nitrogen oxides.

The invention described in item 2 pertains to improvement on the ammonia detoxification device 10 described in item 1, and is featured in that the ammonia decomposition chamber 24 and the thermally decomposed gas burning chamber 26 are communicated with each other via a reduced diameter part 22 having a section area smaller than section areas in the flow direction in both chambers.

In the ammonia detoxification device 10 of the present invention, the gas to be treated F having experienced the thermal decomposition treatment in the ammonia decomposition chamber 24 passes through the reduced diameter part 22 having a small section area before being introduced into the thermally decomposed gas burning chamber 26. Since turbulence occurs as the gas to be treated F rapidly contracts in the reduced diameter part 22, and then rapidly expands after entering the thermally decomposed gas burning chamber 26, agitation of the air A introduced into the thermally decomposed gas burning chamber 26 by the air supplying means 16 and the gas to be treated F after thermal decomposition (namely, containing hydrogen) is accelerated. As a result, hydrogen in the gas to be treated F is more likely to come into contact with oxygen in the air A, and unburned hydrogen is less likely to be discharged from the thermally decomposed gas burning chamber 26.

The invention described in item 3 pertains to improvement on the ammonia detoxification device 10 described in item 1 or 2, and is featured in that:

the air supplying means 16 supplies, to the thermally decomposed gas burning chamber 26, air A in an amount required for burning hydrogen contained in the gas to be treated F from the ammonia decomposition chamber 24, and air A for reducing the temperature of the gas to be treated F to be discharged from the thermally decomposed gas burning chamber 26.

According to the present invention, since the air supplying means 16 supplies air A for reducing the temperature of the gas to be treated F that has been treated (hereinafter, referred to as "treated gas V") discharged from the thermally decomposed gas burning chamber 26, in addition to air A in an amount required for burning hydrogen contained in the gas to be treated F to the thermally decomposed gas burning chamber 26, it is possible to make the treated gas V discharged from the thermally decomposed gas burning chamber 26 have a desired temperature. For example, in such a situation that a heat exchanger 18 for recycling heat retained by the treated gas V discharged from the thermally decomposed gas burning chamber 26 is provided on the downstream side of the thermally decomposed gas burning chamber 26, it is possible to lower the temperature of the treated gas V to the heatproof temperature or lower of the heat exchanger 18.

The invention described in item 4 pertains to improvement on the ammonia detoxification device 10 described in any one of items 1 to 3, and is featured in that:

the gas to be treated F containing ammonia further contains an oxidizable substance that turns into powder when oxidized, the ammonia detoxification device has a casing 12 including an outer casing 156 having an internal space 156a, and an inner casing 158 in the shape of a cylinder with a bottom disposed in the internal space 156a of the outer casing 156 in the condition that a top end thereof is spaced from a ceiling inner face 156b of the outer casing 156, the ammonia decomposition chamber 24 is formed in the internal space 158a of the inner casing 158, the thermally decomposed gas burning chamber 26 is formed between an outer face of the inner casing 158 and an inner face of the outer casing 156, and the air supplying means 16 includes first air supplying means 166 that supplies the thermally decomposed gas burning chamber 26 with air A for burning and oxidizing the hydrogen and the oxidizable substance contained in the gas to be treated F from the ammonia decomposition chamber 24, and second air supplying means 168 that supplies the thermally decomposed gas burning chamber 26 on the downstream side of the first air supplying means 166 with air A for decreasing the temperature of the gas to be treated F to be discharged from the thermally decomposed gas burning chamber 26.

According to the present invention, the gas to be treated F containing ammonia and an oxidizable substance that is to turn into powder when oxidized (for example, Ga (gallium) in the case of the gas to be treated F discharged from a GaN-based LED production device) is introduced into the ammonia decomposition chamber 24 formed inside the inner casing 158, and thus ammonia is thermally decomposed into nitrogen and hydrogen as described above.

Then the gas to be treated F passes between the top end of the inner casing 158 and the ceiling inner face 156b of the outer casing 156, and enters the thermally decomposed gas burning chamber 26 (=space between the outer face of the inner casing 158 and the inner face of the outer casing 156), and for the gas to be treated F, first, air A required for burning and oxidizing the hydrogen and the oxidizable substance is supplied from the first air supplying means 166. Owing to oxygen in the supplied air A, the hydrogen burns to generate water, and the oxidizable substance is oxidized to generate powdery oxide (in the above example, $Ga_2O_3$ (gallium oxide)).

The air A supplied from the first air supplying means 166 is an oxygen source for burning and oxidizing the hydrogen and the oxidizable substance contained in the gas to be treated F, and the gas to be treated F has high temperature (for example, 1300° C.) owing to the reaction heat of burning and oxidation. This is advantageous in that the heat from the gas to be treated F having high temperature transfers the inner casing 158 and heats the gas to be treated F in the ammonia decomposition chamber 24 inside the inner casing 158, and the temperature of the ammonia decomposition chamber 24 can be kept even when the operation rate of the electric heater 14 is decreased.

As a result, even for the gas to be treated F whose heat is difficult to be recycled because it contains an oxidizable substance which is to turn into powder by oxidization, and hence cannot be passed through a general heat exchanger due to containment of after a heat treatment, it is possible to prevent occurrence of obstruction in the flow channel by the powder, and to realize energy-saving operation by using the heat generated in the thermally decomposed gas burning chamber 26 nonwastefully.

Further, when the ammonia concentration in the gas to be treated F is high, the quantity of heat generated in the thermally decomposed gas burning chamber 26 increases, and the ammonia decomposition chamber 24 can be kept at high temperature. Hence, the treatment of the gas to be treated F can be continued even when operation of the electric heater 14 is suspended.

The invention described in item 5 pertains to improvement on the ammonia detoxification device 10 described in item 4, and is featured in that:

the amount of the air A supplied from the first air supplying means 166 is set smaller than a theoretical air amount so that the temperature of the thermally decomposed gas burning chamber 26 is lower than temperatures at which nitrogen oxides are generated, and the amount of the air A supplied from the second air supplying means 168 is adjusted to decrease the temperature of the gas to be treated F to be discharged from the thermally decomposed gas burning chamber 26, and to burn and oxidize the hydrogen and the oxidizable substance that have not been burned or oxidized by the air A from the first air supplying means 166.

By setting the amount of the air A supplied from the first air supplying means 166 smaller than the theoretical air amount which is "the amount required for burning and oxidizing the hydrogen and the oxidizable substance", it is possible to control generation of reaction heat by burning and oxidization even when the amount of ammonia contained in the gas to be treated F is large, and the amount of the hydrogen after thermal decomposition is large. As a result, it is possible to avoid generation of nitrogen oxides (NOx) due to excessively elevated temperature of the thermally decomposed gas burning chamber 26. The hydrogen and the oxidizable substance that have not been burned or oxidized by the air A from the first air supplying means 166 are to be burned and oxidized by the air A from the second air supplying means 168.

The invention described in item 6 pertains to improvement on the ammonia detoxification device 10 described in item 1, and the ammonia detoxification device 10 further include:

three flow channels 102a, 102b, 102c each charged with a heat accumulative filler 104;

gas to be treated supplying means 15 that supplies the gas to be treated F containing ammonia; and treated gas discharging means 17 that discharges treated gas V after burning of the hydrogen, and first end parts in the flow channels 102a, 102b, 102c are mutually communicated, second end parts in the flow channels 102a, 102b, 102c is formed with a ventilation port 105 for receiving the gas to be treated F or the air A from the air supplying means 16, or for discharging the treated gas V, and a connecting state of the gas to be treated supplying means 15, the air supplying means 16, and the treated gas discharging means 17 to the respective ventilation ports 105 of the flow channels 102a, 102b, 102c is switchable without overlaps.

According to the present invention, the gas to be treated supplying means 15, the air supplying means 16, or the treated gas discharging means 17 is connected to any one of the ventilation ports of the flow channels 102a, 102b, 102c without overlaps. As a result, the three flow channels 102a, 102b, 102c can serve as the ammonia decomposition chamber 24, the thermally decomposed gas burning chamber 26, and the air supplying channel 124 depending on the connecting state of these means.

The gas to be treated F supplied to the ammonia decomposition chamber 24 by the gas to be treated supplying means 15 receives heat from the electric heater 14 in the absence of oxygen while passing through the heat accumulative filler 104 charged in the ammonia decomposition chamber 24 (=flow channel 102a), and the ammonia in the gas to be treated F is decomposed into nitrogen and hydrogen when the gas to be treated F reaches one end part of the ammonia decomposition chamber 24.

Then the gas to be treated F after thermal decomposition containing nitrogen and hydrogen enters one end part of the thermally decomposed gas burning chamber 26 (=flow channel 102b) from one end part of the ammonia decomposition chamber 24, and is mixed here with air A flowing from one end part of the air supplying channel 124. Oxygen in the air A binds with the hydrogen (in other words, hydrogen burns) to generate water. As a result, ammonia is decomposed and detoxified into harmless nitrogen and water, and the gas to be treated F becomes treated gas V. The treated gas V passes through the thermally decomposed gas burning chamber 26 and is discharged outside by the treated gas discharging means 17.

At this time, the heat accumulative filler 104 disposed in the flow channel 102 corresponding to the thermally decomposed gas burning chamber 26 accumulates heat from the treated gas V having high temperature after burning of hydrogen, and the treated gas V having decreased temperature as a result of heat removal by the heat accumulative filler 104 is discharged outside through the treated gas discharging means 17.

In the stage that the heat accumulative filler 104 has sufficiently accumulated heat, the connecting state of the gas to be treated supplying means 15, the air supplying means 16, and the treated gas discharging means 17 is switched so that the flow channel 102b having served as the thermally decomposed gas burning chamber 26 is to serve as the ammonia decomposition chamber 24, the flow channel 102a having served as the ammonia decomposition chamber 24 is to serve as the air supplying channel 124, and the flow channel 102c having served as the air supplying channel 124 is to serve as the thermally decomposed gas burning chamber 26.

In this manner, the gas to be treated F containing ammonia can receive heat from the heat accumulative filler 104 having sufficiently accumulated heat, so that a small quantity of heat or no heat from the electric heater 14 is required for thermally decomposing ammonia.

Further, since the heat accumulative filler 104 of the flow channel 102a having been served as the ammonia decomposition chamber 24 also accumulates heat from the electric heater 14, the air A from the air supplying means 16 comes to receive heat of the accumulative filler 104 after the connecting state is switched, and thus the air A can be preliminarily heated before it is introduced into the thermally decomposed gas burning chamber 26.

Further, since the temperature of the heat accumulative filler 104 of the flow channel 102c served as the air supplying channel 124 has decreased to around the temperature of the air A from the air supplying means 16 (for example, ambient temperature), it becomes possible to sufficiently cool the treated gas V having high temperature passing through the heat accumulative filler 104 after the connecting state is switched.

In this manner, by sequentially switching the connecting state at the moment when the heat accumulative filler 104 of the flow channel 102b corresponding to the thermally decomposed gas burning chamber 26 has sufficiently accumulated heat, or at the moment when the accumulated quantity of heat in the heat accumulative filler 104 of the flow channel 102a corresponding to the ammonia decomposition chamber 24 has decreased to a predetermined level or lower, it becomes possible to continue the thermal decomposition of ammonia while suspending the electric heater 14 or decreasing the quantity of heat generation (namely, decreasing power consumption) in the electric heater 14.

Additionally, when the gas to be treated F contains ammonia at a sufficiently high concentration, the amount of hydrogen generated by thermal decomposition increases, and the temperature of treated gas V after burning of the hydrogen also increases. Therefore, when the ammonia concentration in the gas to be treated F is sufficiently high, it is possible to establish a thermal decomposition cycle of ammonia without external energy while suspending the electric heater 14 as described above. And when the ammonia concentration is still higher, it is possible to make use of the remaining heat, for example, by producing water vapor using the surplus heat quantity. In other words, it is possible to use ammonia as a fuel.

Advantageous Effects of the Invention

According to the present invention, it is possible to provide an ammonia detoxification device capable of avoiding generation of nitrogen oxides in detoxifying ammonia by thermal decomposition.

DESCRIPTION OF EMBODIMENTS

Figure 1:
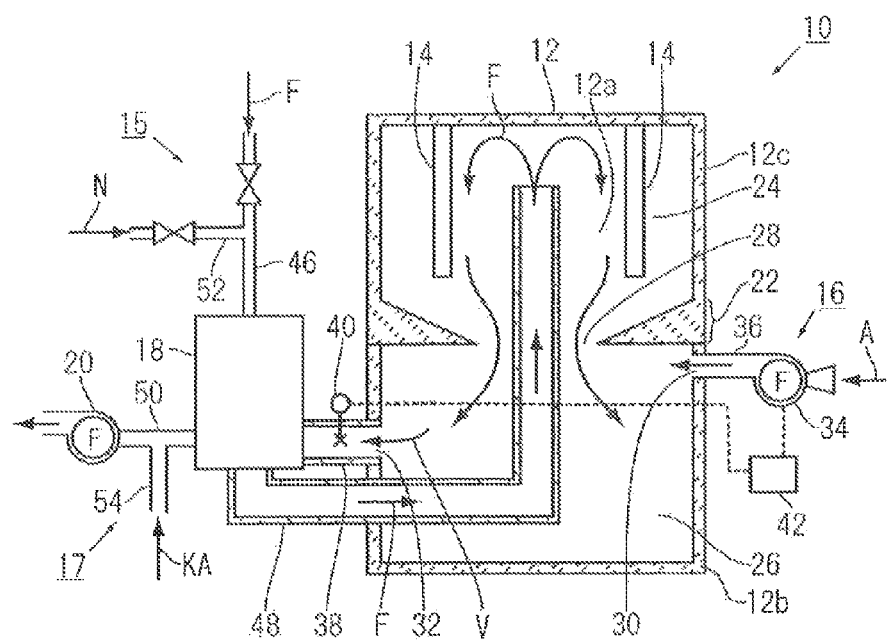
FIG. 1 is a flow diagram concerning an ammonia detoxification device according to a first embodiment of the present invention.

Hereinafter, embodiments of an ammonia detoxification device 10 to which the present invention is applied will be described by reference to drawings. In the ammonia detoxification device 10 according to a first embodiment, the interior of a casing 12 is divided into upper and lower two parts, or divided into inner and outer two parts, and the upper layer (inner side) forms an ammonia decomposition chamber 24 and the lower layer (outer side) forms a thermally decomposed gas burning chamber 26. In an ammonia detoxification device 10 according to a second embodiment, the interior of a cylindrical casing 12 is divided circumferentially into three parts, to form three flow channels 102. By switching inlet/outlet of gas to be treated F, air A and treated gas V, for these flow channels 102, the flow channels 102 are respectively used as an ammonia decomposition chamber 24, a thermally decomposed gas burning chamber 26, and an air supplying channel 124. In the description of the second embodiment, the parts common to those in the first embodiment will not be described by incorporating the description in the first embodiment, and mainly different parts will be described. Regarding reference numerals, when a particular part is designated in generic concept, the part is represented only by an Arabic numeral without an alphabetic branch number, and when the particular part is required to be distinguished (or designated in specific concept), the part is distinguished by a branch number of an alphabetic small letter attached to the Arabic numeral.

(First Embodiment)

As shown in FIG. 1, an ammonia detoxification device 10 according to the first embodiment includes a casing 12, an electric heater 14, gas to be treated supplying means 15, air supplying means 16, treated gas discharging means 17, a heat exchanger 18 provided as necessary, and an exhaust fan 20.

Figure 2:
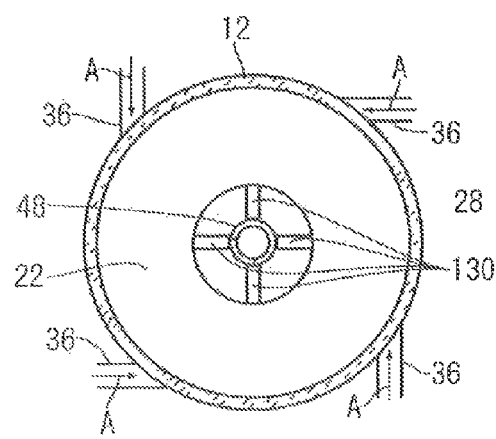
FIG. 2 is a section view of an ammonia detoxification device according to another exemplary form of the first embodiment.

The casing 12 has an internal space 12a, and the outer side thereof is formed of metal such as stainless, and the inner side is applied with a fire-resistant material made of a material having desired quality and a desired thickness. In the present exemplary form, in an approximately center part along the height of the internal space 12a, a reduced diameter part 22 made of a fire-resistant material is formed, and the upper part of the internal space 12a including the reduced diameter part 22 forms an ammonia decomposition chamber 24, and the lower part forms a thermally decomposed gas burning chamber 26. The reduced diameter part 22 has, in its center part, a reduced diameter part communicating port 28 having a section area smaller than the section areas in the flowing direction of the ammonia decomposition chamber 24 and the thermally decomposed gas burning chamber 26. The ammonia decomposition chamber 24 and the thermally decomposed gas burning chamber 26 are communicated with each other through the reduced diameter part communicating port 28. Since in the reduced diameter part communicating port 28, a higher temperature side gas to be treated supplying duct 48 is vertically inserted as will be described later, a supporting portion 130 (four portions are provided in the present exemplary form, however, the number is not limited thereto) may be provided to extend from the circumference of the reduced diameter part communicating port 28 toward the center as shown in FIG. 2 for preventing the higher temperature side gas to be treated supplying duct 48 from swaying.

At a position corresponding to the thermally decomposed gas burning chamber 26 on the lateral face of the casing 12, an air supplying port 30 to which the air supplying means 16 is connected is formed, and at a position lower than the air supplying port 30, a discharging port 32 for discharging treated gas V outside is formed. To the discharging port 32, a higher temperature side discharging duct 38 that allows mutual communication between the thermally decomposed gas burning chamber 26 and the interior of the heat exchanger 18 is connected. To the higher temperature side discharging duct 38, a thermometer 40 for measuring the temperature of the treated exhaust gas is attached, and a signal of the temperature measured at the thermometer 40 is sent to an air supplying fan controller 42 (later described) that controls an air supplying fan 34 (later described).

The casing 12 in the present exemplary form is divided into two parts, upper and lower. An upper casing 12c formed with the reduced diameter part 22 in its bottom part is placed on a lower casing 12b having an open top face, and then they are hermetically sealed to complete the casing 22. Of course, the casing 12 may be of an integrated unit of the upper and the lower parts, or may be divided into three or more parts.

The electric heater 14 is provided for elevating the temperature of the ammonia decomposition chamber 24 up to the temperature at which ammonia can be thermally decomposed, and in the present exemplary form, an electric sheathed heater that is fed by a feeder (not shown) (of course, any other type of electric heater may be used) is inserted into the ammonia decomposition chamber 24 from the top face of the casing 12.

The gas to be treated supplying means 15 is provided for supplying gas to be treated F containing ammonia to the ammonia decomposition chamber 24, and in the present exemplary form, it is made up of a lower temperature side as to be treated supplying duct 46 that supplies gas to be treated F from the gas generation source to the heat exchanger 18, and the higher temperature side gas to be treated supplying duct 48 that supplies gas to be treated F whose temperature is elevated in the heat exchanger 18 to the ammonia decomposition chamber 24.

The higher temperature side gas to be treated supplying duct 48 penetrates the lateral face of the casing 12 corresponding to the thermally decomposed gas burning chamber 26 into the thermally decomposed gas burning chamber 26, and extends upward in the drawing, and the leading end thereof reaches inside the ammonia decomposition chamber 24 through the reduced diameter part communicating port 28 formed in the reduced diameter part 22. As a result, the gas to be treated F flowing inside the higher temperature side gas to be treated supplying duct 48 is able to receive the heat inside the thermally decomposed gas burning chamber 26 and the ammonia decomposition chamber 24, so that it has a sufficiently high temperature at the point of time when it is discharged through the higher temperature side gas to be treated supplying duct 48. Therefore, it is possible to reduce the quantity of heat from the electric heater 14 required for keeping the temperature of the ammonia decomposition chamber 24.

in the present exemplary form, a high-temperature nitrogen introducing duct 52 for introducing high-temperature nitrogen N into gas to be treated F is connected with the lower temperature side gas to be treated supplying duct 46, and with this arrangement, the situation that the gas to be treated F needs to be heated prior to introduction into the heat exchanger 18 can be dealt with, for example, at the startup of the device 10.

The air supplying means 16 is provided for supplying the thermally decomposed gas burning chamber 26 with air A from outside for burning hydrogen generated by thermal decomposition of ammonia in gas to be treated F, and in the present exemplary form, it is made up of the air supplying fan 34, an air supplying duct 36, and the air supplying fan controller 42. In the drawing, the air supplying duct 36 supplies at a position slightly below the reduced diameter part 22. However, a plurality of air supplying ducts 36 may be provided and air A may be supplied from the entire circumference of the casing 12 so that air A and gas to be treated F are mixed more uniformly. As shown in FIG. 2, a plurality of air supplying ducts 36 may be attached along the tangent lines of the casing 12, and air A may be supplied along the tangent lines inside the thermally decomposed gas burning chamber 26 to generate vortex in the chamber 26, thereby accelerating mixing of gas to be treated F and air A.

The air supplying fan 34 is provided for supplying the thermally decomposed gas burning chamber 26 with external air A through the air supplying port 30 of the casing 12 via the air supplying duct 36, and the air supply amount is controlled by the air supplying fan controller 42 having received a temperature signal from the thermometer 40 attached to the higher temperature side discharging duct 38.

Now, controlling of the air supply amount will be concretely described. Air A that is supplied to the thermally decomposed gas burning chamber 26 by the air supplying means 16 has two roles. The first role is as an oxygen source for burning hydrogen generated by thermal decomposition of ammonia, and the second role is as cooling air for cooling treated gas V whose temperature is elevated as a result of burning of hydrogen. When the heat exchanger 18 that receives treated gas V having exited the thermally decomposed gas burning chamber 26 is provided as is in the case of the present exemplary form, the temperature of the treated gas V should be not more than the heatproof temperature of the heat exchanger 18 (for example, 1000° C.). (When the heat exchanger 18 is not provided, the heatproof temperature of the exhaust fan 20 is relevant.) For this reason, the air supplying fan controller 42 is designed to be able to control the air supplying fan 34 to supply the sum of the air amount as an oxygen source that is calculable from the amount of ammonia contained in the gas to be treated F, and the amount of required cooling air. Although not shown in the drawing, for controlling the air amount more accurately, a signal from a generation source of gas to be treated F or from an ammonia concentration meter provided in the gas to be treated supplying means 15 may be introduced into the air supplying fan controller 42, and the air supplying fan 34 may be controlled by the air supplying fan controller 42 to supply an air amount in which both "amount of air as an oxygen source" and "amount of cooling air" are optimized.

The treated gas discharging means 17 is made up of the foregoing higher temperature side discharging duct 38 that allows mutual communication between the thermally decomposed gas burning chamber 26 and the heat exchanger 18, and a lower temperature side discharging duct 50 that guides the treated gas V discharged from the heat exchanger 18 to the exhaust fan 20. Of course, when the heat exchanger 18 is not provided, it may be structured by only one discharging duct that mutually connects the thermally decomposed gas burning chamber 26 and the exhaust fan 20. In the present exemplary form, a diluting air supplying duct 54 that supplies diluting air KA is connected with the lower temperature side discharging duct 50, for finally diluting the treated gas V discharged from the heat exchanger 18.

The heat exchanger 18 that is provided as needed receives the treated gas V having high temperature discharged from the thermally decomposed gas burning chamber 26 through the higher temperature side discharging duct 38, while receiving the gas to be treated F through the lower temperature side gas to be treated supplying duct 46. By preliminarily heating the gas to be treated F by heat of the treated gas V, the temperature of the gas to be treated F that is to be supplied to the ammonia decomposition chamber 24 is further elevated and the energy consumption by the electric heater 14 is reduced. At the same time, the temperature of the treated gas V is decreased, and the exhaust fan 20 is prevented from being damaged by heat. The type of the heat exchanger 18 is not particularly limited, and any types including a shell-and-tube type and a plate type are applicable.

The exhaust fan 20 is provided for discharging the treated gas V introduced through the lower temperature side discharging duct 50 to an external certain place, and keeping the interior of the ammonia detoxification device 10 at an appropriate negative pressure, and may be any type of fan including a turbo fan, a radial fan, an axial fan, a sirocco fan, and the like.

A procedure of detoxifying ammonia contained in gas to be treated F using the ammonia detoxification device 10 according to the first embodiment will be described. First, the electric heater 14 is started up to start elevation of the temperature of the ammonia decomposition chamber 24. Upon confirmation that the temperature inside the ammonia decomposition chamber 24 is sufficiently higher than the decomposition temperature of ammonia, the air supplying fan 34 in the air supplying means 16 is started up to start supply of air A to the thermally decomposed gas burning chamber 26 through the air supplying duct 36. Then supply of the gas to be treated F to the lower temperature side gas to be treated supplying duct 46 from the generation source (not shown) is started.

The gas to be treated F that is supplied to the lower temperature side gas to be treated supplying duct 46 is introduced into the heat exchanger 18, and it receives heat from the hot air discharged from the thermally decomposed gas burning chamber 26 inside the heat exchanger 18 to have elevated temperature (in the initial stage of the treatment, the gas is not yet treated gas V, and the air A that is supplied by the air supplying means 16 and experienced temperature elevation in the thermally decomposed gas burning chamber 26 is discharged as hot air). Then after passing the thermally decomposed gas burning chamber 26 through the higher temperature side gas to be treated supplying duct 48, the gas F is discharged into the ammonia decomposition chamber 24.

The ammonia discharged into the ammonia decomposition chamber 24 receives heat from the electric heater 14 in the absence of oxygen, and is decomposed into nitrogen and hydrogen as represented by the following formula. By thermally decomposing ammonia in the absence of oxygen in this manner, theoretically no nitrogen oxide is generated in thermal decomposition of ammonia.

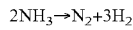

Then the gas to be treated F after thermal decomposition containing nitrogen and hydrogen is received by the thermally decomposed gas burning chamber 26 where it is supplied with air A from outside by the air supplying means 16. The hydrogen and oxygen in the air bind (in other words, hydrogen burns) as represented by the following formula to generate water. As a result, ammonia is decomposed and detoxified into harmless nitrogen and water, and the gas to be treated F has turned to treated gas V.

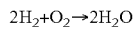

The gas to be treated F after thermal decomposition in the ammonia decomposition chamber 24 passes the reduced diameter part communicating port 28 in the reduced diameter part 22 having a small section area before being introduced into the thermally decomposed gas burning chamber 26. Since turbulence occurs as the gas to be treated F rapidly contracts in the reduced diameter part 22, and then rapidly expands after entering the thermally decomposed gas burning chamber 26, agitation of the air A introduced into the thermally decomposed gas burning chamber 26 by the air supplying means 16 and the gas to be treated F after thermal decomposition (namely, containing hydrogen) is accelerated. As a result, hydrogen in the gas to be treated F becomes more likely to come into contact with oxygen in the air, allowing reduction in unburned hydrogen to be discharged from the thermally decomposed gas burning chamber 26.

The treated gas V discharged from the thermally decomposed gas burning chamber 26 through the discharging port 32 enters the heat exchanger 18 through the higher temperature side discharging duct 38, and its temperature is decreased by heat exchange with new gas to be treated F. Then the treated gas V is discharged from the heat exchanger 18, and discharged outside through the lower temperature side discharging duct 50 and the exhaust fan 20.

As described above, according to the ammonia detoxification device 10 of the present exemplary form, it is possible to decompose and detoxify ammonia into nitrogen and water without generation of nitrogen oxides.

Additionally, since the air supplying fan controller 42 in the air supplying means 16 controls the air supplying fan 34 to supply the air A for decreasing the temperature of the gas to be treated F, in addition to the air A in an amount required for burning the hydrogen contained in the gas to be treated F, to the thermally decomposed gas burning chamber, it is possible to make the treated gas V have a desired temperature at the time when it is discharged from the thermally decomposed gas burning chamber 26, and for example, to decrease the temperature of the treated gas V to be lower than or equal to the heatproof temperature of the heat exchanger 18 (for example, 1000° C.).

Figure 3:
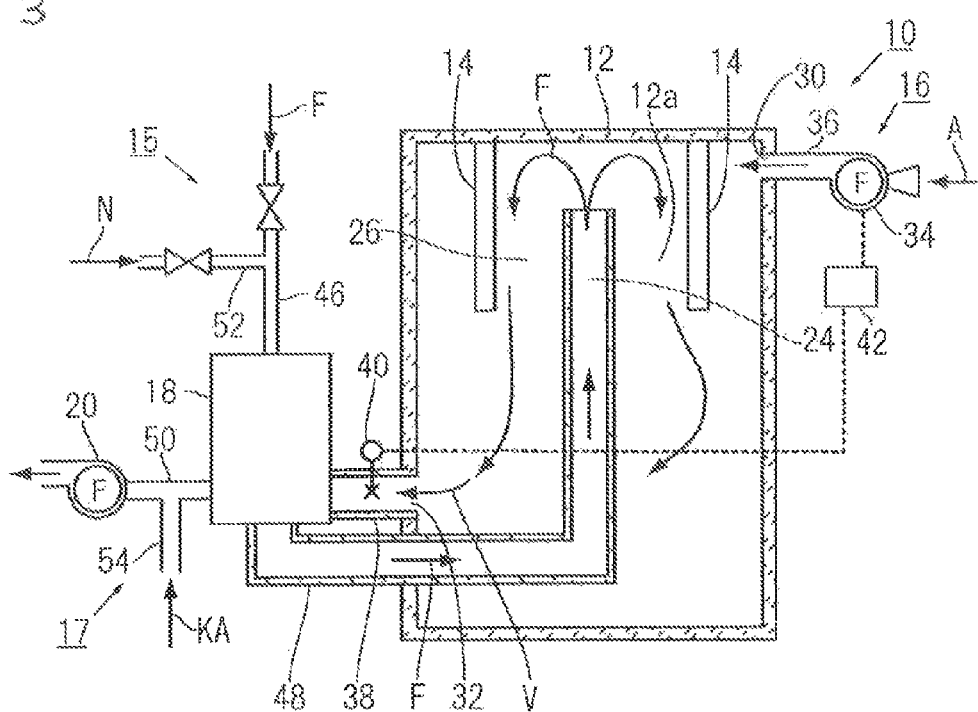
FIG. 3 is a flow diagram of an ammonia detoxification device according to still another exemplary form of the first embodiment.

In the above exemplary form, the interior of the casing 12 is divided into the ammonia decomposition chamber 24 and the thermally decomposed gas burning chamber 26. However, if the gas to be treated F can be thermally decomposed sufficiently by the heat received from the electric heater 14 during flowing through the higher temperature side gas to be treated supplying duct 48, the interior of the higher temperature side gas to be treated supplying duct 48 can serve as the ammonia decomposition chamber 24, and the interior of the casing 12 can serve as the thermally decomposed gas burning chamber 26, as shown in FIG. 3. Accordingly, for the same size of the casing 12, the opportunity of contact between the hydrogen generated by thermal decomposition and the oxygen in the air A can be increased by increasing the volume of the thermally decomposed gas burning chamber 26, and the possibility that unburned hydrogen is discharged from the casing 12 can be further reduced.

In the case where the gas to be treated F supplied to the ammonia detoxification device 10 contains an oxidizable substance that turns into powder when oxidized, in addition to ammonia, the gas to be treated F after the heat treatment will contain powder. In this case, use of the heat exchanger 18 as is in the aforementioned exemplary form can cause accumulation of powder in the heat exchanger 18, and in the worst case, the flow channel is obstructed, and the treatment of the gas to be treated F can no longer be continued.

Figure 4:
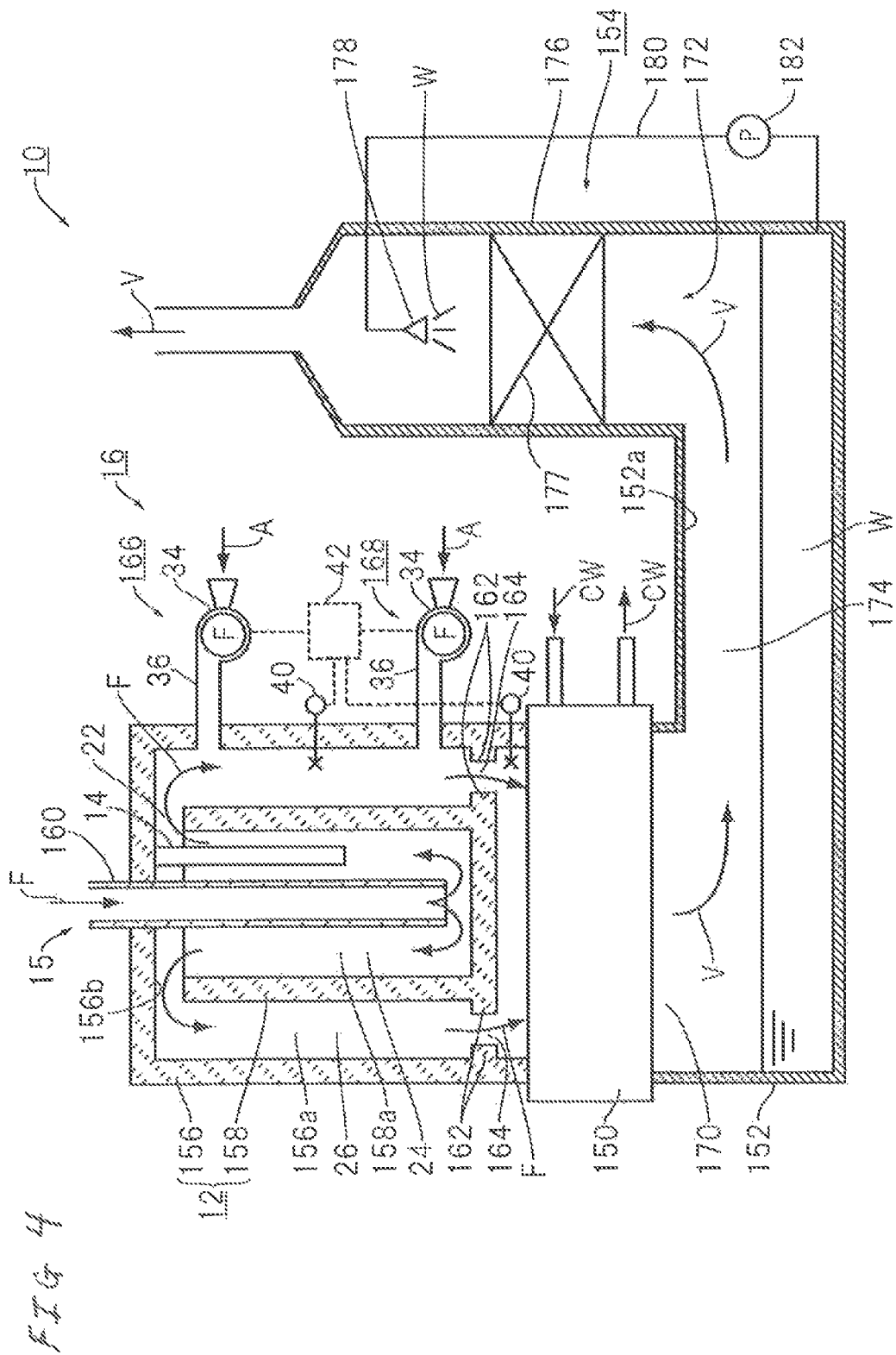
FIG. 4 is a flow diagram of an ammonia detoxification device according to a further exemplary form of the first embodiment.

For addressing this, another exemplary form of the ammonia detoxification device 10 that is suited for treating gas to be treated F containing oxidizable substance as shown in FIG. 4 is conceivable.

The ammonia detoxification device 10 according to the present exemplary form includes a gas cooler 150, a circulating water tank 152, and an exit scrubber 154, in addition to the casing 12, the electric heater 14, the gas to be treated supplying means 15, and the air supplying means 16 as described above.

The casing 12 in the present exemplary form has an outer casing 156 and an inner casing 158. The outer casing 156 is formed into a cylinder with a lid and without a bottom having an internal space 156a, made of the same material as the casing 12 described above. The inner casing 158 is formed into a cylinder without a lid and with a bottom, and is disposed in the internal space 156a of the outer casing 156 in such a manner that its top end is spaced from a ceiling inner face 156b of the outer casing 156. The electric heater 14 and a supplying duct 160 for the gas to be treated supplying means 15 extend downward in the drawing to the internal space 158a of the inner casing 158 from the top face of the outer casing 156. In particular, the leading end (lower end in the drawing) of the gas to be treated supplying duct 160 is situated near the bottom face of the inner casing 158. As is in the case of the foregoing exemplary form, a high-temperature nitrogen introducing duct (not shown) may be connected with the gas to be treated supplying duct 160.

As a result, the internal space 158a of the inner casing 158 serves as the ammonia decomposition chamber 24, and the space between the outer face of the inner casing 158 and the inner face of the outer casing 156 serves as the thermally decomposed gas burning chamber 26. The space between the top end of the inner casing 158 and the ceiling inner face 156b of the outer casing 156 serves as the reduced diameter part 22.

From each of the lateral face of the bottom of the inner casing 158, and the inner face of the outer casing 156 opposed to the same, a protrusion 162 is projected, and a second reduced diameter part 164 having a reduced section area in the flow direction is formed between these protrusions. Although the second reduced diameter part 164 is not an essential constituent, it is preferred to form the second reduced diameter part 164 because by forming this, turbulence occurs in the thermally decomposed gas burning chamber 26, and more uniform temperature of the gas to be treated F is achieved.

The air supplying means 16 of the present exemplary form includes first air supplying means 166 that supplies the thermally decomposed gas burning chamber 26 with air A serving as an oxygen source for burning and oxidizing hydrogen and an oxidizable substance contained in gas to be treated F from the ammonia decomposition chamber 24, and second air supplying means 168 that supplies the thermally decomposed gas burning chamber 26 situated on the downstream side of the first air supplying means 166 with air A for decreasing the temperature of the gas to be treated F discharged from the thermally decomposed gas burning chamber 26, and each of the air supplying means 166, 168 is made up of the air supplying fan 34 and the air supplying duct 36.

An air supply amount of each air supplying fan 34 is controlled individually by the air supplying fan controller 42 that receives a temperature signal from a pair of thermometers 40 respectively disposed in the center part of the thermally decomposed gas burning chamber 26 and on the downstream side of the second reduced diameter part 164. An air supply amount is controlled, for example, in such a manner that an air supply amount from the first air supplying means 166 is adjusted to keep a certain temperature based on a temperature signal from the thermometer 40 attached in the center part of the thermally decomposed gas burning chamber 26. In other words, when the temperature is high, the air amount is controlled to be smaller than "the amount required for burning and oxidizing the hydrogen and the oxidizable substance" (=equivalent, theoretical air amount) to reduce the quantity of heat to be generated, whereas when the temperature is low, the air amount is controlled to be more approximate to the theoretical air amount. At the same time, the air supply amount from the second air supplying means 168 is controlled based on a temperature signal from the thermometer 40 attached on the downstream side of the second reduced diameter part 164 in such a manner as to keep the temperature suited for introduction into the gas cooler 150 on the trailing side (for example, 1000° C.). Of course, the method for controlling an air supply amount is not limited to this.

The gas cooler 150 is provided for cooling the treated gas V (gas to be treated F) having high temperature (for example, 1000° C.) discharged from the bottom part of the outer casing 156 through the second reduced diameter part 164, and in the present exemplary form, a water-cooling jacket structure that exchanges heat between cooling water CW flowing inside, and treated gas V (gas to be treated F) is employed. However, the gas cooler 150 of a different system may be employed. It is not necessary to provide the gas cooler 150, when the amount of air A for cooling supplied from the second air supplying means 168 of the air supplying means 16 is increased and the temperature of the treated gas V is decreased to such a temperature that bears direct discharge into the circulating water tank 152 (for example, to about 400° C.).

The circulating water tank 152 is a water tank for retaining water W (or may be a chemical liquid in place of water W) to be injected in the exit scrubber 154, and on its top face, a gas cooler attachment hole 170 for receiving treated gas V (gas to be treated F) having passed through the gas cooler 150, and an exit scrubber attachment hole 172 to which the exit scrubber 154 is to be attached are provided. Between the water surface of retained water W and an inner top face 152*a* of the circulating water tank 152, a gas to be treated flowing space 174 is formed, and the treated gas V (gas to be treated F) flowing into the circulating water tank 152 through the gas cooler attachment hole 170 passes through the gas to be treated flowing space 174 and then is discharged through the exit scrubber attachment hole 172. A water cooler (not shown) for cooling water W to be retained may be provided.

The exit scrubber 154 is made up of a cylinder 176 whose lower end is attached to the exit scrubber attachment hole 172 of the circulating water tank 152, a water injection nozzle 178 that injects water W downwardly in the drawing inside the cylinder 176 (in the direction opposite to the flow of treated gas V (gas to be treated F)), a water distribution pipe 180 that is connected, at its one end, to the bottom part of the circulating water tank 152 and at its other end, to the water injection nozzle 178, and a water feed pump 182 attached to the water distribution pipe 180, for feeding water retained in the circulating water tank 152 to the water injection nozzle 178. The reference numeral 177 in FIG. 4 shows a filler such as Tellerette (registered trade name). By disposing the filler 177 inside the exit scrubber 154, gas-liquid contact between water W injected by the water injection nozzle 178 and treated gas V can occur more efficiently.

In the present exemplary form, the gas to be treated F supplied inside the inner casing 158, namely into the ammonia decomposition chamber 24 through the gas to be treated supplying duct 160 receives heat from, for example, the electric heater 14 in the absence of oxygen, and is decomposed into nitrogen and hydrogen. By thermally decomposing ammonia in the absence of oxygen in this manner, theoretically, no nitrogen oxide is generated by thermal decomposition of ammonia.

The gas to be treated F after thermal decomposition then passes through the reduced diameter part 22 and enters the thermally decomposed gas burning chamber 26 where hydrogen in the gas to be treated F is burned by the air A supplied from the first air supplying means 166 and the oxidizable substance is oxidized to turn into powder.

The gas to be treated F having high temperature after burning and oxidization receives air A from the second air supplying means 168 and is cooled to such a temperature that bears introduction into the gas cooler 150 (for example, 1000° C.), and then discharged from the casing 12 through the second reduced diameter part 164. From this point, the gas to be treated F is called treated gas V.

The treated gas V discharged from the casing 12 is further cooled (for example, to 400° C.) after passing through the gas cooler 150, and introduced into the circulating water tank 152. Then it enters the exit scrubber 154 from the circulating water tank 152, and is further cooled by the water W injected from the water injection nozzle 178 and the powder is separated. The treated gas V that is cooled to several tens degree Celsius and from which the powder is separated is then discharged outside the system.

According to the present exemplary form, the gas to be treated F after thermal decomposition passes through the reduced diameter part 22 between the top end of the inner casing 158 and the ceiling inner face 156*b* of the outer casing 156, and enters the thermally decomposed gas burning chamber 26 where the gas to be treated F is first supplied with air A in an amount required for burning and oxidizing the hydrogen and the oxidizable substance from the first air supplying means 166. Owing to the oxygen in the supplied air A, hydrogen burns to generate water, and the oxidizable substance is oxidized to generate powdery oxide (in the above example, $Ga_2O_3$ [gallium oxide]).

When the amount of the air A supplied from the first air supplying means 166 is set at "the amount required for burning and oxidizing the hydrogen and the oxidizable substance" (=equivalent, theoretical air amount), the gas to be treated F will have the highest temperature (for example, 1300° C.) by the reaction heat of burning and oxidation. This is advantageous in that the heat from the gas to be treated F having elevated temperature transfers the inner casing 158 and heats the gas to be treated F in the ammonia decomposition chamber 24 inside the inner casing 158, and the temperature of the ammonia decomposition chamber 24 can be kept even when the operation rate of the electric heater 14 is decreased.

In this manner, even for the gas to be treated F that contains an oxidizable substance which is to turn into powder by oxidization, and hence cannot be passed through the heat exchanger 18 because of containment of the powder after heat treatment, it is possible to prevent occurrence of obstruction in the flow channel by the powder, and to realize energy-saving operation by using the heat generated in the thermally decomposed gas burning chamber 26 nonwastefully.

Further, when the ammonia concentration in the gas to be treated F is high, the quantity of heat generated in the thermally decomposed gas burning chamber 26 increases, and the ammonia decomposition chamber 24 can be kept at high temperature. Hence, the treatment of the gas to be treated F can be continued even when operation of the electric heater 14 is suspended.

Of course, the amount of the air A to be supplied from the first air supplying means 166 may be set to be smaller than the theoretical air amount so that the temperature of the thermally decomposed gas burning chamber 26 is lower than generation temperatures of nitrogen oxides, and the amount of the air A to be supplied from the second air supplying means 168 may be adjusted to decrease the temperature of the gas to be treated F discharged from the thermally decomposed gas burning chamber 26 and to burn and oxidize the hydrogen and the oxidizable substance that have not been burned or oxidized by the air A from the first air supplying means 166.

With this measure, even when the gas to be treated F contains a large amount of ammonia, and the amount of hydrogen after thermal decomposition is large, generation of reaction heat by burning and oxidation can be controlled, and generation of nitrogen oxides (NOx) due to excessively elevated temperature of the thermally decomposed gas burning chamber 26 can be avoided. The hydrogen and the oxidizable substance that have not been burned or oxidized by the air A from the first air supplying means 166 are burned and oxidized by the air A from the second air supplying means 168.

Although not shown in the drawing, between the outer face and the inner face facing to the internal space 158a of the inner casing 158, a gas to be treated flowing space may be formed through which the gas to be treated F that is to be supplied to the internal space 158a serving as the ammonia decomposition chamber 24 flows.

Concretely, the cylindrical part of the inner casing 158 in the present exemplary form is formed to have double-walled structure, and a gas to be treated flowing space is formed between an inner wall and an outer wall of the double-walled structure. The gas to be treated flowing space is a space through which the gas to be treated F that is to be supplied to the ammonia decomposition chamber 24 flows. It communicates in the bottom part of the inner casing 158, with the internal space 158a (namely, the ammonia decomposition chamber 24), penetrates the outer casing 156 from the top part of the inner casing 158, and is connected to the gas to be treated supplying means 15. The internal space 158a of the inner casing 158 and the internal space 156a of the outer casing 156 communicate with each other in the upper part of the inner casing 158.

In this manner, by providing the cylindrical part of the inner casing 158 with a gas to be treated flowing space, the gas to be treated F flowing through the gas to be treated flowing space receives heat from the thermally decomposed gas burning chamber 26 to be sufficiently preheated before entering the ammonia decomposition chamber 24. As a result, ammonia in the gas to be treated F is more reliably decomposed in the ammonia decomposition chamber 24, and energy saving can be achieved because of reduction in electricity usage in the electric heater 14 for heating.

(Second Embodiment)

Figure 5:
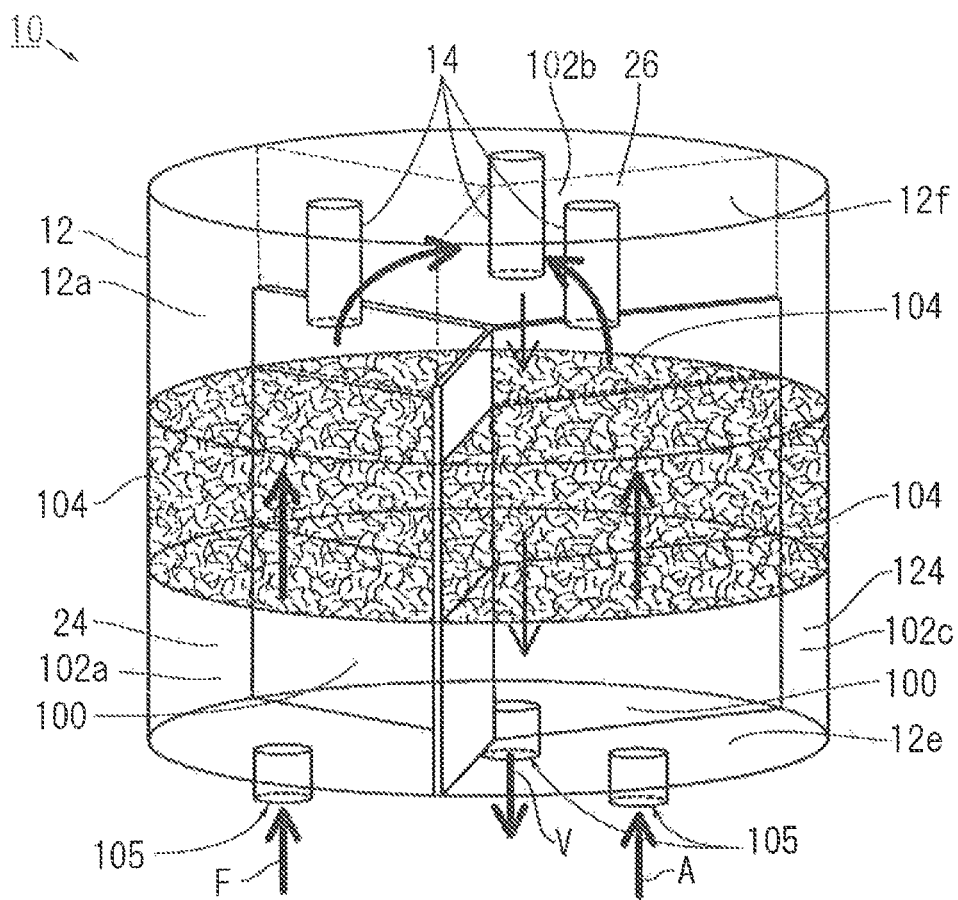
FIG. 5 is a perspective view concerning an ammonia detoxification device according to a second embodiment of the present invention.
Figure 6:
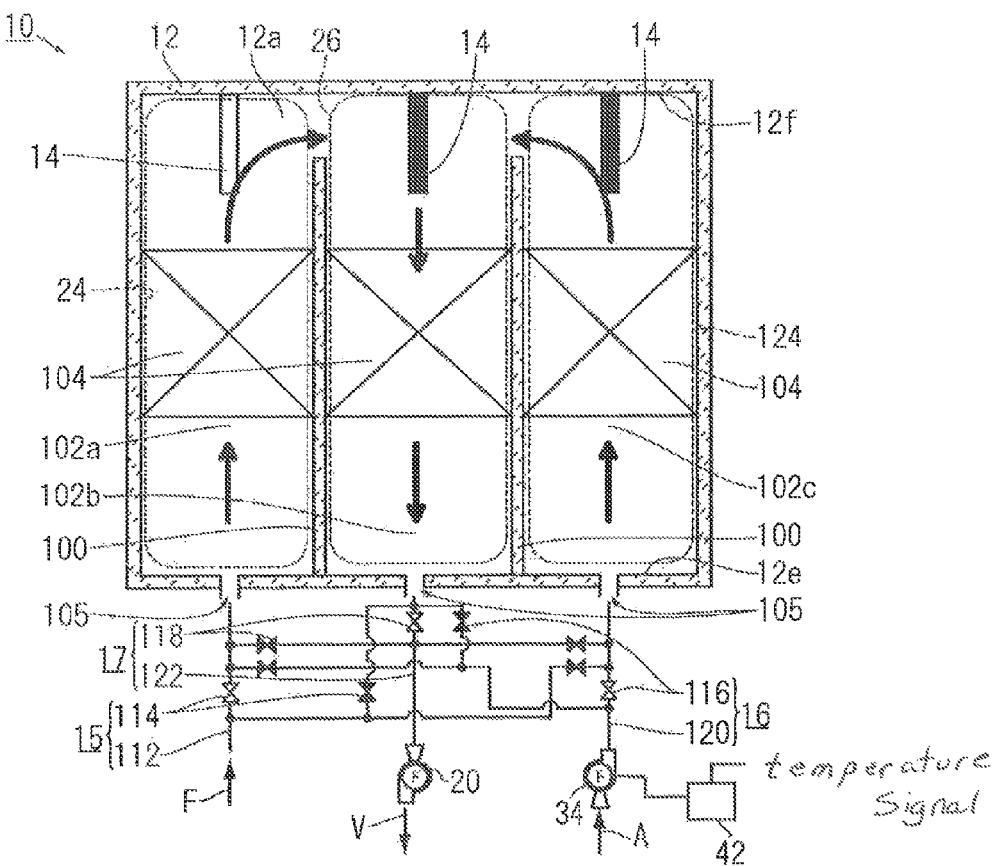
FIG. 6 is a flow diagram of the ammonia detoxification device according to the second embodiment.

Next, referring to FIGS. 5 and 6, the ammonia detoxification device 10 according to the second embodiment will be described. As described above, the ammonia detoxification device 10 of the second embodiment includes three flow channels 102 formed by circumferentially dividing the interior of the casing 12 in the shape of a cylinder into three parts by a partition plate 100, and by switching inlet/outlet for gas to be treated F, air A, and treated gas V, the flow channels 102 are sequentially used as an ammonia decomposition chamber 24, the thermally decomposed gas burning chamber 26, and the air supplying channel 124. In the description of the second embodiment, the parts common to those in the first embodiment will not be described again by incorporating the description in the first embodiment, and mainly different parts will be described. In FIG. 6, while three flow channels 102a, 102b, 102c are depicted side by side two-dimensionally for easy understanding of the flow of each gas or the like, the flow channels 102a and 102c on the opposite ends are next to each other.

The ammonia detoxification device 10 according to the second embodiment includes the casing 12, the electric heater 14, the gas to be treated supplying means 15, the air supplying means 16, the treated gas discharging means 17, and the exhaust fan 20.

The cylindrical casing 12 has an internal space 12a, and the outer side thereof is formed of metal such as stainless, and the inner side is applied with a fire-resistant material made of a material having desired quality and a desired thickness. The internal space 12a is circumferentially divided into three parts by the partition plate 100 formed of a heatproof material such as a fireproof material, and as a result, is divided into the three flow channels 102a, 102b, 102c along the height of the casing 12.

The lower end in the drawing of the partition plate 100 abuts on an inner bottom face 12e of the casing 12, and on the other hand, the upper end in the drawing of the partition plate 100 is spaced from an inner top face 12f of the casing 12. Therefore, first end parts of the three flow channel 102a, 102b, 102c (namely, upper end side in the drawing) communicate with one another in the upper end part of the casing 12.

A second end of each of the flow channels 102a, 102b, 102c, specifically, at a position in the inner bottom face 12e of the casing 12 corresponding to each of the flow channels 102a, 102b, 102c, a ventilation port 105 for receiving gas to be treated F or air A from air supplying means 16, or discharging treated gas V is formed. As will be described later, the connecting state of the gas to be treated supplying means 15, the air supplying means 16, and the treated gas discharging means 17 to the ventilation ports 105 of the flow channels 102a, 102b, 102c can be switched without overlaps.

Figure 7:
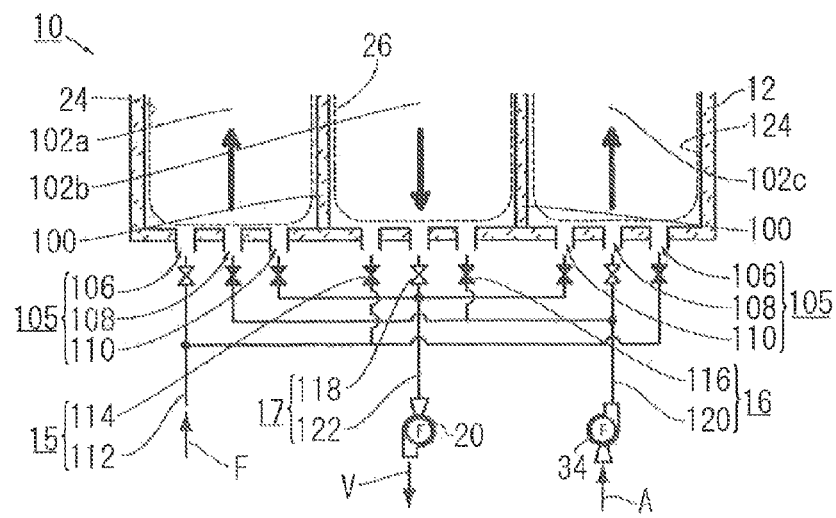
FIG. 7 is a flow diagram showing another exemplary form according to the second embodiment.

In the example of FIG. 6, one ventilation port 105 is formed in each of the second ends of the flow channels 102a, 102b, 102c. However, as shown in FIG. 7, the ventilation port 105 may be made up of a gas to be treated receiving port 106 for receiving gas to be treated F, an air receiving port 108 for receiving air A from the air supplying means 16, and a treated gas discharging port 110 for discharging treated gas V, and the gas to be treated supplying means 15, the air supplying means 16, and the treated gas discharging means 17 corresponding to the ports 106, 108, 110 may be respectively connected.

In the center part of each of the flow channels 102, a heat accumulative filler 104 is charged. The heat accumulative filler 104 is formed of a material capable of accumulating a large quantity of heat, having a large surface area, and having heat resistance, like particulate, massive or fibrous ceramics. An example of the heat accumulative filler 104 includes a honeycomb heat accumulative material containing spodumene, cordierite, porcelain, or porous porcelain.

Likewise in the first embodiment, the electric heater 14 is an electric sheathed heater fed through a feeder (not shown) (of course, any other type of electric heater is applicable), and in the present exemplary form, three electric heaters 14 are disposed to hang from the inner top face 12f of the casing 12 corresponding to the respective flow channels 102a, 102b, 102c.

The gas to be treated supplying means 15 of the present exemplary form is branched into three ways on the downstream side so as to supply the gas to be treated F from a generation source to the ventilation ports 105 (or the gas to be treated receiving ports 106) of the flow channels 102a, 102b, 102c, and is made up of a gas to be treated supplying duct 112 having downstream ends respectively connected with the ventilation ports 105 (or the gas to be treated receiving ports 106), and three gas to be treated switching valves 114 each attached to the gas to be treated supplying duct 112 situated on the downstream side of the branched position.

The gas to be treated switching valve 114, and an air supply switching valve 116 and a treated gas switching valve 118 as will be described later may be any type of valves including a ball valve and a sluice valve, and may be a manual valve or an automatic valve. The switching valves 114, 116, 118 may also be configured by a single three-way valve. Although not shown in the drawing, a high-temperature nitrogen introducing duct 52 for introducing nitrogen having high temperature into the gas to be treated F may be connected with the gas to be treated supplying duct 112 as described in the first embodiment.

The air supplying means 16 of the present exemplary form is branched into three ways on its downstream side so as to supply the ventilation port 105 (or the air receiving port 108) of each of the flow channels 102a, 102b, 102c with air A from outside for burning the hydrogen generated by thermal decomposition of ammonia in the gas to be treated F, and is made up of an air supplying duct 120 having downstream ends each connected with the ventilation port 105 (or air receiving port 108), three air supply switching valves 116 each attached to the air supplying duct 120 situated on the downstream side of the branched position, the air supplying fan 34, and the air supplying fan controller 42. Control of the air supply amount is as described in the first embodiment.

The treated gas discharging means 17 of the present exemplary form is branched into three ways on its upstream side so as to discharge the treated gas V from each of the flow channels 102a, 102b, 102c, and is made up of a treated gas discharging duct 122 having upstream ends each connected with the ventilation port 105 (or the treated gas discharging port 110), and three treated gas switching valves 118 each attached to the treated gas discharging duct 122 situated on the upstream side of the branched position. A downstream end of the treated gas discharging duct 122 is connected with an exhaust fan 20. Although not shown in the drawing, likewise in the first embodiment, a diluting air supplying duct 54 for supplying diluting air KA for finally diluting the treated gas V may be connected on the downstream side of the treated gas discharging duct 122.

Next, a procedure of detoxifying ammonia in gas to be treated F using the ammonia detoxification device 10 according to the second embodiment will be described. First, the three flow channels 102a, 102b, 102c are respectively set as the ammonia decomposition chamber 24, the thermally decomposed gas burning chamber 26, and the air supplying channel 124 (in FIG. 6, the flow channel 102a is set as the ammonia decomposition chamber 24, the flow channel 102b is set as the thermally decomposed gas burning chamber 26, and the flow channel 102c is set as the air supplying channel 124). Then the gas to be treated switching valve 114, the treated gas switching valve 118, and the air supply switching valve 116 are set so that the gas to be treated supplying duct 112 is connected with the ammonia decomposition chamber 24, the treated gas discharging duct 122 is connected with the thermally decomposed gas burning chamber 26, and the air supplying duct 120 is connected with the air supplying channel 124 without overlaps.

Then the electric heater 14 corresponding to the flow channel 102a serving as the ammonia decomposition chamber 24 is started up to start elevation of the temperature of the ammonia decomposition chamber 24 (at this time, other electric heaters 14 may be suspended). Upon confirmation that the internal temperature of the ammonia decomposition chamber 24 is sufficiently higher than the ammonia decomposition temperature, the air supplying fan 34 in the air supplying means 16 is started up to start supply of air A to the air supplying channel 124 through the air supplying duct 120. Thereafter, supply of gas to be treated F from a generation source (not shown) to the gas to be treated supplying duct 112 is started.

The gas to be treated F supplied to the gas to be treated supplying duct 112 is supplied inside the ammonia decomposition chamber 24 through the ventilation port 105, and receives heat from the electric heater 14 in the absence of oxygen while passing through the heat accumulative filler 104 charged inside the ammonia decomposition chamber 24 (=flow channel 102a), and reaches an upper end part of the ammonia decomposition chamber 24, where the gas to be treated F has been decomposed into nitrogen and hydrogen as represented by the following formula. By thermally decomposing ammonia in the absence of oxygen in this manner, theoretically no nitrogen oxide is generated in thermal decomposition of ammonia.

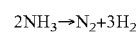

$$2NH_3 \rightarrow N_2 + 3H_2$$

Then the gas to be treated F after thermal decomposition containing nitrogen and hydrogen flows from the upper end part of the ammonia decomposition chamber 24 into an upper end part of the thermally decomposed gas burning chamber 26 (=flow channel 102b) where it is mixed with air A flowing from an upper end part of the air supplying channel 124 (=flow channel 102c). As represented by the following formula, hydrogen binds with oxygen in the air A (namely, hydrogen burns) to generate water. As a result, ammonia is decomposed and detoxified into harmless nitrogen and water, and the gas to be treated F becomes treated gas V. Due to burning of hydrogen, the temperature of the treated gas V is higher than the temperature of the gas to be treated F after thermal decomposition of ammonia.

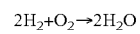

$$2H_2 + O_2 \rightarrow 2H_2O$$

The treated gas V flows through the thermally decomposed gas burning chamber 26 downward in the drawing, and passes through the heat accumulative filler 104 charged in the flow channel 102b where heat of the gas is drawn and the gas is cooled. The treated gas V having passed through the heat accumulative filler 104 enters the exhaust fan 20 through the treated gas discharging duct 122, and is discharged outside from the exhaust fan 20.

Figure 8:
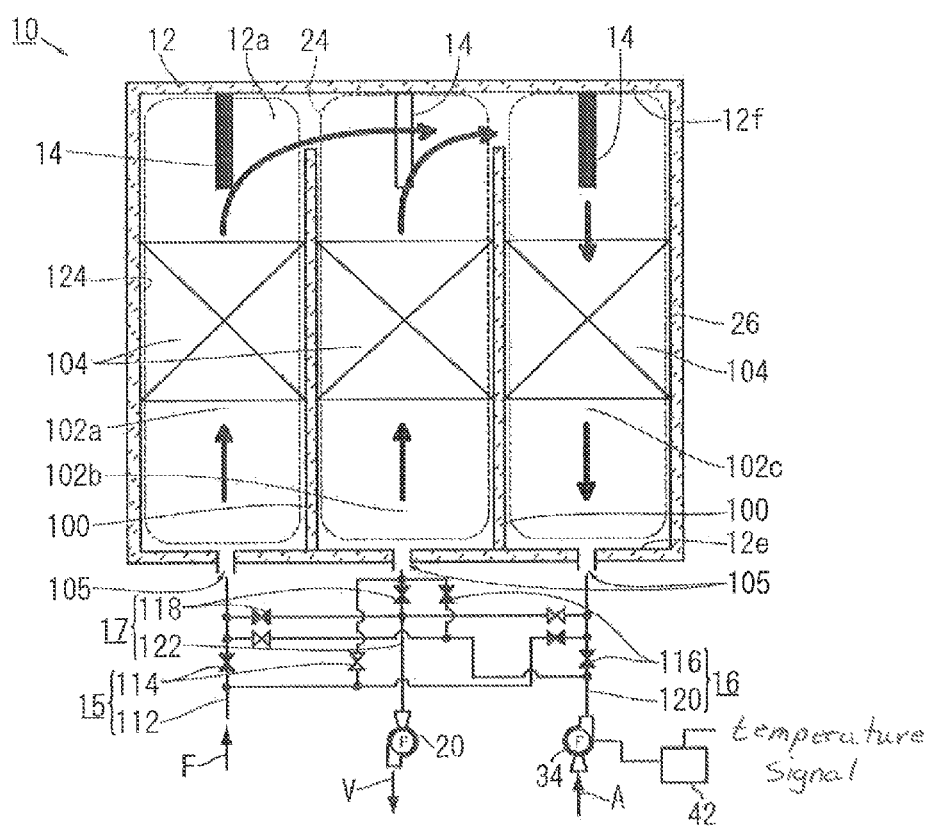
FIG. 8 is a flow diagram showing the state that the supply destination of the gas to be treated is switched from the state shown in FIG. 6.

The ammonia detoxifying treatment is continued for a while in this condition, and at the time when the heat accumulative filler 104 charged in the thermally decomposed gas burning chamber 26 has accumulated sufficient heat, the connecting state of the gas to be treated supplying means 15, the air supplying means 16, and the treated gas discharging means 17 is switched as shown in FIG. 8 so that the flow channel 102b having served as the thermally decomposed gas burning chamber 26 is to serve as the ammonia decomposition chamber 24, the flow channel 102a having served as the ammonia decomposition chamber 24 is to serve as the air supplying channel 124, and the flow channel 102c having served as the air supplying channel 124 is to serve as the thermally decomposed gas burning chamber 26. Also, the electric heater 14 of the flow channel 102a is suspended, and the electric heater 14 of the flow channel 102b is started up.

By switching the connecting state in this manner, the gas to be treated F introduced into the flow channel 102b having served as the thermally decomposed gas burning chamber 26 can receive the heat from the heat accumulative filler 104 that has accumulated sufficient heat from treated gas V, so that the heat from the electric heater 14 of the flow channel 102b that is necessary for decomposing ammonia in the gas to be treated F is small. Further, when the concentration of ammonia in the gas to be treated F is high, the amount of generated hydrogen increases, and the temperature of treated gas V increases, so that heat from the electric heater 14 may be unnecessary.

Further, since the heat accumulative filler 104 of the flow channel 102a having served as the ammonia decomposition chamber 24 accumulates heat from the electric heater 14, the air A from the air supplying means 16 receives heat of the heat accumulative filler 104 after the aforementioned switching of the connecting state, and thus the air A can be preliminarily heated prior to introduction into the thermally decomposed gas burning chamber 26.

Further, since the temperature of the heat accumulative filler 104 of the flow channel 102c having served as the air supplying channel 124 is decreased to around the temperature of air A from the air supplying means 16 (for example, ambient temperature), the treated gas V having high temperature that passes through the heat accumulative filler 104 can be sufficiently cooled after the aforementioned switching of the connecting state.

In this manner, by sequentially switching the connecting state at the moment when the heat accumulative filler 104 of the flow channel 102b corresponding to the thermally decomposed gas burning chamber 26 has sufficiently accumulated heat (for example, when the temperature difference of the treated gas V between at the inlet and at the outlet of the heat accumulative filler 104 in the thermally decomposed gas burning chamber 26 is less than or equal to a predetermined temperature difference, or when the temperature of the treated gas V at the outlet of the heat accumulative filler 104 is higher than or equal to a predetermined temperature, it can be determined as "sufficiently accumulated heat"), or at the moment when the accumulated quantity of heat in the heat accumulative filler 104 of the flow channel 102a corresponding to the ammonia decomposition chamber 24 has decreased to a predetermined level or lower (for example, when the temperature difference of the gas to be treated F between at the inlet and at the outlet of the heat accumulative filler 104 in the ammonia decomposition chamber 24 is less than or equal to a predetermined temperature difference, or when the temperature of the gas to be treated F at the outlet of the heat accumulative filler 104 is lower than or equal to a predetermined temperature, it can be determined as "accumulated quantity of heat has decreased to a predetermined level or lower"), it becomes possible to continue the thermal decomposition of ammonia while suspending the electric heater 14 or decreasing the quantity of heat generation (namely, decreased power consumption) in the electric heater 14.

Additionally, when the gas to be treated F contains ammonia at a sufficiently high concentration as described above, the amount of hydrogen generated by thermal decomposition increases, and the temperature of treated gas V after burning of the hydrogen also increases. Therefore, when the ammonia concentration in the gas to be treated F is sufficiently high, it is possible to establish a thermal decomposition cycle of ammonia without external energy while suspending the electric heater 14 as described above. And when the ammonia concentration is still higher, it is possible to make use of the remaining heat, for example, by producing water vapor using the surplus heat quantity. In other words, it is possible to use ammonia in the gas to be treated F as a fuel.

Description of The Reference Characters 10 ammonia detoxification device
12 casing
14 electric heater
15 gas to be treated supplying means
16 air supplying means
17 treated gas discharging means
18 heat exchanger
20 exhaust fan
22 reduced diameter part
24 ammonia decomposition chamber
26 thermally decomposed gas burning chamber
28 reduced diameter part communicating port
30 air supplying port
32 discharging port
34 air supplying fan
36 air supplying duct
38 higher temperature side discharging duct
40 thermometer
42 air supplying fan controller
46 lower temperature side gas to be treated supplying duct
48 higher temperature side gas to be treated supplying duct
50 lower temperature side discharging duct
52 high-temperature nitrogen introducing duct
54 diluting air supplying duct
100 partition plate
102 flow channel
104 heat accumulative filler
105 ventilation port
106 gas to be treated receiving port
108 air receiving port
110 treated gas discharging port
112 gas to be treated supplying duct
114 gas to be treated switching valve
116 air supply switching valve
118 treated gas switching valve
120 air supplying duct
122 treated gas discharging duct
124 air supplying channel
130 supporting portion
150 gas cooler
152 circulating water tank
154 exit scrubber
156 outer casing
158 inner casing
160 gas to be treated supplying duct
162 protrusion
164 reduced diameter part
166 first air supplying means
168 second air supplying means
170 gas cooler attachment hole
172 exit scrubber attachment hole 174 gas to be treated flowing space
176 cylinder
178 water injection nozzle
180 water distribution pipe
182 water feed pump
F gas to be treated
A air
V treated gas

The invention claimed is:

1. An ammonia detoxification device comprising:
an electric heater;
an ammonia decomposition chamber that receives gas to be treated containing ammonia, and thermally decomposes the ammonia in the absence of oxygen by heat from the electric heater;
a thermally decomposed gas burning chamber that receives the gas to be treated containing nitrogen and hydrogen generated by thermal decomposition of the ammonia discharged from the ammonia decomposition chamber;
air supplying means that supplies air for burning the hydrogen from outside to the thermally decomposed gas burning chamber;
wherein
the gas to be treated containing ammonia further contains an oxidizable substance that turns into powder when oxidized,
the ammonia detoxification device has a casing including an outer casing having an internal space, and an inner casing in the shape of a cylinder with a bottom disposed in the internal space of the outer casing in a condition that a top end thereof is spaced from a ceiling inner face of the outer casing,
the ammonia decomposition chamber is formed in an internal space of the inner casing,
the thermally decomposed gas burning chamber is formed between an outer face of the inner casing and an inner face of the outer casing,
the air supplying means includes first air supplying means that supplies the thermally decomposed gas burning chamber with air in an amount required for burning and oxidizing the hydrogen and the oxidizable substance contained in the gas to be treated from the ammonia decomposition chamber, and second air supplying means that supplies the thermally decomposed gas burning chamber on the downstream side of the first air supplying means with air for decreasing the temperature of the gas to be treated to be discharged from the thermally decomposed gas burning chamber
the amount of the air supplied from the first air supplying means is set smaller than a theoretical air amount so that the temperature of the thermally decomposed gas burning chamber is lower than temperatures at which nitrogen oxides are generated, and
the amount of the air supplied from the second air supplying means is adjusted to decrease the temperature of the gas to be treated to be discharged from the thermally decomposed gas burning chamber, and to burn and oxidize the hydrogen and the oxidizable substance that have not been burned or oxidized by the air from the first air supplying means.

2. The ammonia detoxification device according to claim 1, wherein the ammonia decomposition chamber and the thermally decomposed gas burning chamber communicate with each other via a reduced diameter part having a section area smaller than section areas in the flow direction in both chambers.

3. An ammonia detoxification device comprising:
an electric heater;
an ammonia decomposition chamber that receives gas to be treated containing ammonia, and thermally decomposes the ammonia in the absence of oxygen by heat from the electric heater;
a thermally decomposed gas burning chamber that receives the gas to be treated containing nitrogen and hydrogen generated by thermal decomposition of the ammonia discharged from the ammonia decomposition chamber;
air supplying means that supplies air for burning the hydrogen from outside to the thermally decomposed gas burning chamber;
three flow channels each charged with a heat accumulative filler;
gas to be treated supplying means that supplies the gas to be treated containing ammonia; and
treated gas discharging means that discharges treated gas after burning of the hydrogen,
first end parts in the flow channels being mutually communicated,
second end parts in the flow channels being formed with a ventilation port for receiving the gas to be treated or the air from the air supplying means, or for discharging the treated gas,
a connecting state of the gas to be treated supplying means, the air supplying means, and the treated gas discharging means to the respective ventilation ports of the flow channels being switchable without overlaps.

* * * * *